UNILATERALIZED TRANSISTOR RELAY SYSTEM

Filed Dec. 19, 1960 3 Sheets-Sheet 1

INVENTOR.
BEN H. TONGUE
BY Rines and Rines
ATTORNEYS

INVENTOR.
BEN H. TONGUE
BY Rines and Rines
ATTORNEYS

UNILATERALIZED TRANSISTOR RELAY SYSTEM

Filed Dec. 19, 1960 3 Sheets-Sheet 3

INVENTOR.
BEN H. TONGUE
BY
Rines and Rines
ATTORNEYS

United States Patent Office 3,156,872
Patented Nov. 10, 1964

3,156,872
UNILATERALIZED TRANSISTOR RELAY SYSTEM

Ben H. Tongue, West Orange, N.J., assignor to Blonder-Tongue Electronics, Newark, N.J., a corporation of New Jersey Filed Dec. 19, 1960, Ser. No. 76,786
12 Claims. (Cl. 330—27)

The preesnt invention relates to transistor systems, being particularly directed to neutralizing or unilateralizing amplifying relay circuits and the like.

The term "unilateralization" is herein employed in the following sense. If one considers an amplifying relay having an input and an output, the gain produced by that relay, as an input signal passes through the relay to the output, may be readily measured. That gain represents the ratio of the output signal to the input signal, and may be termed the forward gain. If, on the other hand, one considers the reverse gain, that is the result in the input of applying a signal to the output, the degree of so-called unilateralization may be defined as the ratio of the forward gain to the reverse gain. The larger this number is, of course, the less the effect of reverse gain, and, therefore, the greater the degree of unilateralization.

In the vacuum-tube art, for example, one is faced with the interelectrode coupling that exists in the tube between the output circuit and the input circuit, which coupling contributes to the so-called reverse gain. Unilateralization may be achieved through the various neutralizing techniques advanced throughout the years, such as those, for example, taught in my prior Letters Patent Nos. 2,761,023 and 2,778,934.

Considering, however, transistor relays, such circuits do not involve just the simple capacitive 90° feedback coupling between output and input that is encountered with electron tubes. This is because the only place at which a physical connection can actually be made to the base electrode of the transistor, is an external point where a so-called spreading resistance (caused by the contact between the emitter and the base) is introduced into the circuit. If one connects to the available external point of access to the base electrode, therefore, one really connects through an effective resistance in series with the true base electrode. The collector-to-base feedback path through the transistor relay thus involves resistance, and not just pure capacitive coupling that would produce the 90° phase shift. It is therefore necessary to provide some mechanism for taking into account the fact that this spreading resistance does exist in the back-coupling circuit and for producing some effective unilateralization corresponding to neutralization in the case of electron tubes.

An object of the present invention, accordingly, is to provide a new and improved transistor neutralizing or unilateralization system.

A further object is to provide a novel transistor relay circuit of more general utility, as well.

Other and further objects will be explained hereinafter and will be more particularly pointed out in connection with the appended claims.

The invention will now be described in connection with the accompanying drawings, FIG. 1 of which is a circuit diagram of a preferred embodiment of the invention;

Figure 1:
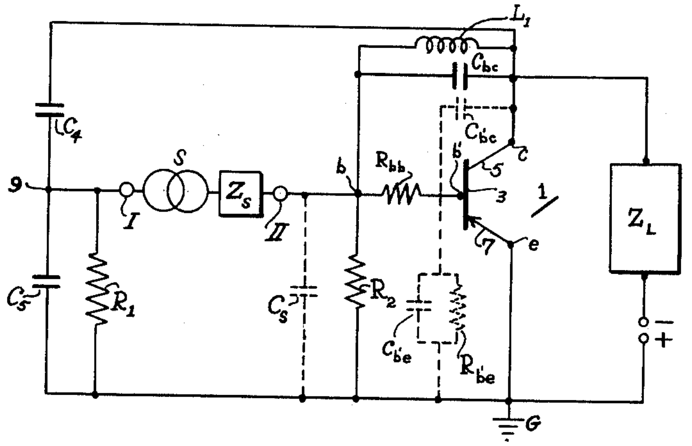

Referring to FIG. 1, a transistor amplifier relay 1 is shown comprising a base electrode 3, a collector electrode 5, and an emitter electrode 7, the latter of which may be grounded from its external connection point $e$, as at the terminal G. The term "ground" is used herein to connote not only actual earthing, but also chassis or other reference potential. Any desired output load $Z_L$ may be connected between the external connection terminal $c$ of the collector 5, and the terminal $e$ of the emitter 7, in the output circuit of the relay 1. The actual external point or physical terminal where a physical connection can be made to the base 3 is shown at the terminal $b$. Terminal $b$, however, connects to the true terminal point $b'$ at the actual base 3, which point $b'$ cannot physically be touched, through the before-mentioned spreading resistance $R_{bb}$ caused by the contacting of the emitter 7 with the base 3. Between this theoretical internal point $b'$, or true base, and the collector 5, there exists the inherent base-to-collector capacitance $C_{b'c}$, shown dotted. There also exists, between the point $b'$ and the emitter terminal $e$, or ground terminal G, the inherent capacitance $C_{b'e}$, shunted by the base-to-emitter internal resistance $R_{b'e}$.

In every physical circuit, a further capacitance $C_{bc}$ is present, which represents the capacitance of the transistor socket and "header" or emerging lead capacitance between the physical connection point $b$ and the collector terminal $c$. At very high frequencies, this capacitance $C_{bc}$ may comprise two capacitances; one representing the socket capacitance, and the other representing the header capacitance at the point where the lead comes out of the transistor, interconnected by inductance representing the inductance of the lead. For present purposes, however, this will be treated as the capacitor $C_{bc}$.

In accordance with the present invention, this socket-and-header capacitance is neutralized out in any conventional manner, as, for example, with the aid of the inductance $L_1$, shown connected in parallel therewith in order to resonate out the effect of the capacitor $C_{bc}$. Other types of neutralizing systems may similarly be used, such as those, for example, described in my said prior Letters Patent.

Even if compensation is effected for the presence of the socket and header capacitances, however, this will not prevent coupling back from the output to the input of the transistor amplifier 1. Interelectrode capacitance $C_{b'c}$ must be, in effect, neutralized out, or otherwise compensated for, even though it is physically impossible to make a connection to the true base point $b'$ within the transistor 1. This is accomplished, in accordance with the present invention, by the use of further capacitance elements $C_4$ and $C_5$, connected in series respectively between the collector terminal $c$ and the emitter ground terminal G, with the intermediate point 9 thereof connected to a terminal I, constituting one of the terminals of the input of the transistor stage 1. The other input terminal II is directly connected to the base contact terminal $b$. A source of signal energy S is connected, not between the base and the emitter, but in series circuit between the terminals I and II, thus floating above the ground terminal G, with the source inherent internal impedance shown schematically at $Z_s$.

The capacitance elements $C_4$ and $C_5$ are adjusted, in accordance with the invention, such that their ratio is made substantially equal to the ratio $$\frac{C_{b'c}}{C_{b'e}}$$

Assuming the value of resistor $R_{b'e}$ to be high relative to the capacitive reactance of $C_{b'e}$ at the frequencies in question, if a signal were applied between the output terminals *c* and *e*, there would be substantially no voltage developed between the input terminals I and II, caused by the injection of a signal between the output terminals *c* and *e*. The device has, therefore, been unilateralized.

Direct-current biasing conditions are ignored in this circuit in order not to complicate the drawing unduly with features not significant to the invention. The main supply voltage source —, +, is thus shown connected in the load circuit. In actual practice, a D.C. blocking capacitor, not shown, would be connected between the left-hand terminal of the neutralizing inductance $L_1$ of FIG. 1 and the point *b*, for example, as is well-known; and a blocking condenser would similarly be connected to the input terminal II in the input circuit, as is also well-known. A conventional source of bias current is also not shown for purposes of simplicity.

In actual practice, the above technique will be satisfactory for the higher frequencies. At lower frequencies, on the other hand, the resistance $R_{b'e}$ will not necessarily have a sufficiently high value to be ignored. It is then necessary to introduce the resistor $R_1$ in shunt with the capacitor $C_5$ such that the product $R_1 C_5$ is substantially equal to the product $R_{b'e}C_{b'e}$, in order to attain the desired unilateralizing effect. Also, in actual practical circuits, there may be some stray capacitance shown dotted at $C_S$. In order to overcome this effect, the neutralizing inductance $L_1$ is slightly detuned, so that the effective capacitance of the neutralizing circuit $L_1$–$C_{bc}$ has a ratio with respect to $C_S$ that is substantially the same as the before-mentioned ratio of $C_4$-to-$C_5$ and $C_{b'c}$-to-$C_{b'e}$. In addition, in order to take care of the possible effect of resistor $R_{b'e}$, a further resistance $R_2$ may be connected in shunt with the stray capacitance $C_S$ in order that the product $C_sR_2$ is substantially equal to the product $C_5R_1$.

Figure 2:
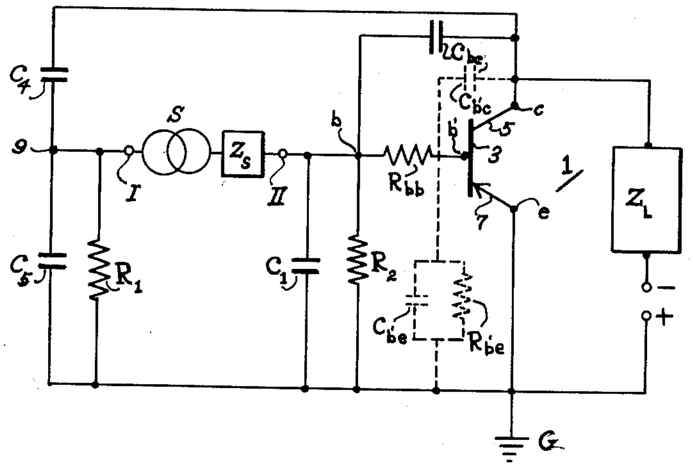
FIG. 2 is a similar diagram of a modified single-ended circuit.

As a further illustration of other types of circuits that may be utilized in connection with the capacitance $C_{bc}$, reference may be made to the embodiment of FIG. 2. A further capacitor $C_1$ is there shown connected from the point *b* to the ground terminal G, and the ratio $C_{bc}:C_1$ is adjusted to have a value corresponding to the ratio $C_4:C_5$, which as before discussed, is adjusted to correspond to the ration $C_{b'c}:C_{b'e}$. Again, a further resistor $R_1$ may be employed where the resistance $R_{b'e}$ is of significance, with the product $C_1R_2$ made substantially equal to the product $C_5R_1$. The circuit of FIG. 2 has a relatively low-Q output impedance and would be limited to systems that can employ such a type of output impedance.

Typical circuit values for a system operating with, for example, a 2N 502 transistor in the frequency range of from 50 to 200 megacycles, would involve $C_{b'e}$ of the order of 80 micro-microfarads; $C_{b'c}$ of the order of 0.2 to 0.3 micro-microfarad; $C_{bc}$ of the order of 0.6 micro-microfarad; $R_{b'e}$ of the order of 1500 ohms; and $R_{bb}$ of the order of 75 ohms. The ratio $C_4:C_5$ will have a value of the order of .003 to .004, approximately.

Figure 3:
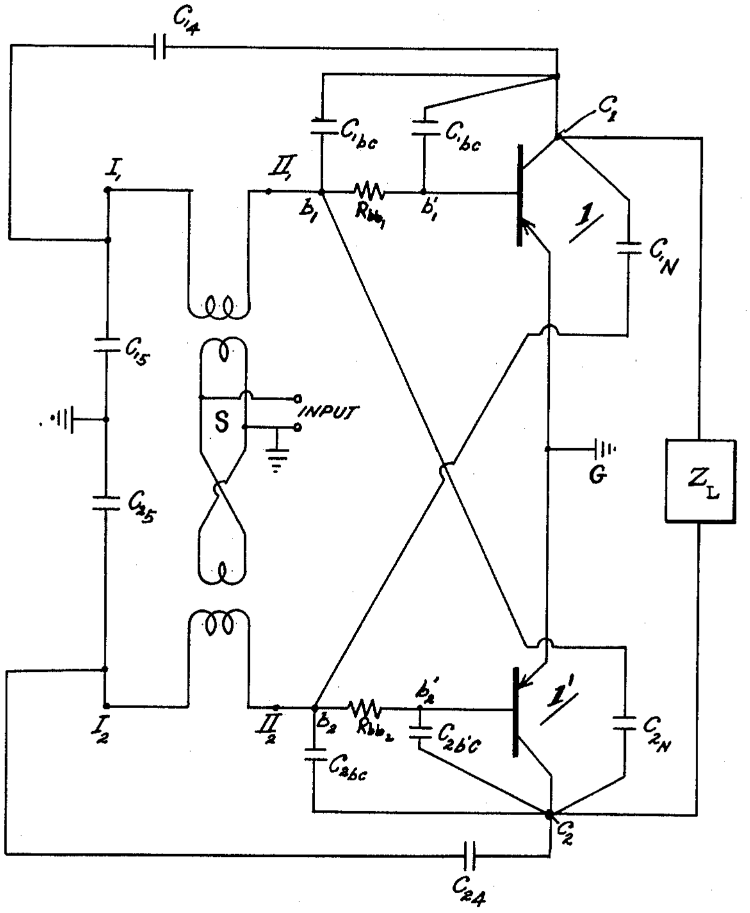
FIG. 3 is a circuit diagram of a modified push-pull embodiment.

While the circuits of FIGS. 1 and 2 are single ended, the invention is also applicable to push-pull circuits, as illustrated in FIG. 3. The input signal source S is there shown as a push-pull transformer, and a pair of similar stages, corresponding to that of FIG. 1, are provided; the upper stage bearing subscript 1 and the lower stage, subscript 2, to define the parts corresponding to those of the circuit of FIG. 1.

Instead of employing inductance $L_1$, to neutralize $C_{bc}$, as in FIG. 1, and instead of employing capacitance $C_1$, to act in conjunction with modified capacitances $C_4$ and $C_5$ to provide bridge neutralization, as in FIG. 2, the circuit of FIG. 3 employs the pair of balanced cross-connected capacitors $C_{1N}$ and $C_{2N}$ to effect a bridge-type of neutralization for capacitors $C_{1bc}$ and $C_{2bc}$.

Figure 4:
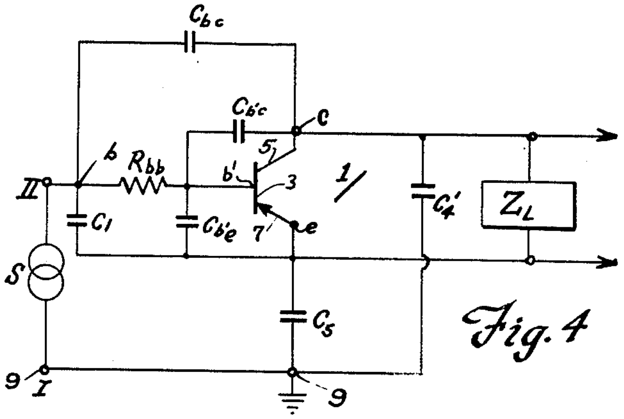
FIGS. 4, 5 and 6 are diagrams of further modifications illustrating different input-terminal grounding and collector grounding circuits.

If the true ground terminal is at point 9 instead of at G, the output load $Z_L$ will float with respect to ground, and the input terminal I will then be grounded, as shown in FIG. 4, with power sources omitted for convenience. The results of the present invention will also be obtained, however, with the adjustments and ratios above explained, in connection with the embodiment of FIG. 2, but with the capacitance $C_5$ serving the additional function of a by-pass condenser that would normally be required across a bias resistor feeding direct-current to the emitter *e*.

Also, $C_{4'}$ in FIG. 4 represents the stray collector-to-ground capacitance eliminating the necessity for a physical external capacitance $C_4$, as in FIG. 2.

Figure 5:
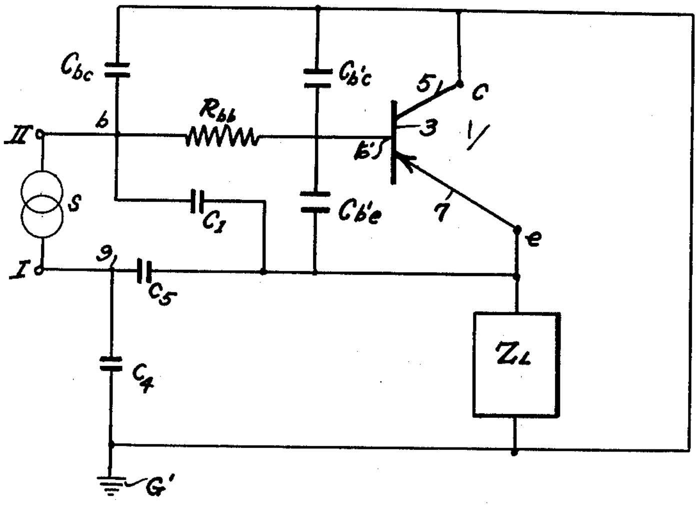

Grounded collector operation at G′ can also be obtained in accordance with the invention, with the same ratios, before discussed, FIG. 5, as where the transistor 1 is constructed with the collector connected by a low thermal-resistance connection to the transistor case in order to clamp the case to the chassis for heat-removal purposes. Similarly, effectively grounded base operation, with terminal II grounded at G″, FIG. 6, may be employed.

Figure 6:
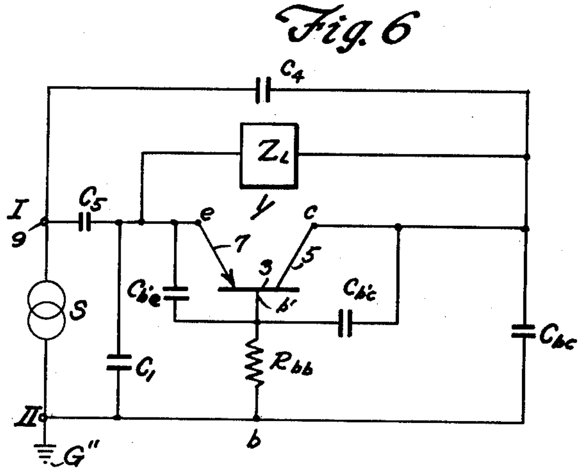

In each of the embodiments of FIGS. 4, 5 and 6, moreover, inductive neutralization for $C_{bc}$ may be attained, as in the embodiment of FIG. 1, as may the push-pull operation of FIG. 3 be employed.

Further modifications will occur to those skilled in the art and all such are considered to follow within the spirit and scope of the invention, as defined in the appended claims.

What is claimed is:

1. A transistor relay system for operation over a band of frequencies having, in combination, a transistor relay provided with a base, an emitter and a collector inherently having an effective internal collector-to-true base capacitance $C_{b'c}$, a spreading resistance $R_{bb}$ between the true and physical base terminals, an emitter-to-true base capacitance $C_{b'e}$, shunt resistance $R_{b'e}$, and an effective socket and header capacitance and the like $C_{bc}$ between the collector electrode and the said physical base terminal; the system including a load connected between the collector and emitter, a pair of series-connected capacitance elements connected between the collector and emitter, a first input terminal connected to the point of series connection of the pair of capacitance elements, a second input terminal connected to the said physical base terminal, and means for neutralizing the capacitance $C_{bc}$ over the said band of frequencies, the ratio of the capacitance elements of the pair of capacitance elements being adjusted to correspond substantially to that of $C_{b'c}/C_{b'e}$ in order to unilateralize the said relay.

2. A transistor relay as claimed in claim 1 and in which further resistance is connected across the one capacitance element of the pair of capacitance elements connected from the said point of series connection to the emitter, and the product of that further resistance and the said one capacitance element is adjusted to correspond substantially to the product $C_{b'e}R_{b'e}$.

3. A transistor relay as claimed in claim 1 and in which the emitter is grounded and further resistance is connected between the said physical base terminal and ground so that the product of the same and any stray capacitance $C_s$ between the physical base terminal and ground is adjusted to correspond substantially to the product $C_{b'e}R_{b'e}$.

4. A transistor relay as claimed in claim 1 and in which the said neutralizing means comprises resonating inductance connected across the said capacitance $C_{bc}$.

5. A transistor relay as claimed in claim 1 and in which further capacitance $C_1$ is connected between the physical base terminal and ground of value such that $C_{bc}/C_1$ is substantially equal to $C_{b'c}/C_{b'e}$.

6. A transistor relay as claimed in claim 5 and in which further resistance $R_2$ is connected across $C_1$ such that $C_1R_2$ is substantially equal to $C_{b'e}R_{b'e}$.

7. A pair of transistor relay circuits as claimed in claim 1 having their respective input terminals connected in push-pull to a source of energy and their respective collector electrodes connected to opposite terminals of a common load.

8. A transistor relay circuit as claimed in claim 1 and in which the said neutralizing means comprises resonating inductance connected across the said capacitance $C_{bc}$ and slightly detuned to cause the ratio of the effective capacitance of the said capacitance $C_{bc}$ and its said neutralizing inductance to the stray capacitance between the said physical base terminal and ground to correspond substantially to the ratio $C_{b'c}/C_{b'e}$.

9. A transistor relay circuit as claimed in claim 1 and in which the said first input terminal is grounded.

10. A transistor relay circuit as claimed in claim 1 and in which the emitter is grounded.

11. A transistor relay circuit as claimed in claim 1 and in which the collector is grounded.

12. A transistor relay circuit as claimed in claim 1 and in which the said second input terminal is grounded.

References Cited in the file of this patent

UNITED STATES PATENTS

| | | |
|---|---|---|
| 2,663,766 | Meacham | Dec. 22, 1953 |
| 2,801,299 | Knol et al. | July 30, 1957 |

OTHER REFERENCES

Chu: "Unilateralization of Junction Transistor Amplifiers," Proceedings of IRE, August 1955, pages 1001–1006.

Houser: "Unilater Transistor Amplifier," Proceedings of National Electronic Conference, October 1955, pages 74–82.